(12) United States Patent
Sugie

(10) Patent No.: US 11,483,482 B2
(45) Date of Patent: Oct. 25, 2022

(54) ELECTRONIC DEVICE THAT DISPLAYS A PLURALITY OF DISPLAY ITEMS ON A DISPLAY AND METHOD FOR CONTROLLING ELECTRONIC DEVICE

(71) Applicant: CANON KABUSHIKI KAISHA, Tokyo (JP)

(72) Inventor: Takashi Sugie, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/190,298

(22) Filed: Mar. 2, 2021

(65) Prior Publication Data

US 2021/0281768 A1 Sep. 9, 2021

(30) Foreign Application Priority Data

Mar. 6, 2020 (JP) .............................. JP2020-039158

(51) Int. Cl.
*H04N 5/232* (2006.01)
*G06F 3/0482* (2013.01)
*G06F 3/04883* (2022.01)

(52) U.S. Cl.
CPC ..... *H04N 5/232933* (2018.08); *G06F 3/0482* (2013.01); *G06F 3/04883* (2013.01)

(58) Field of Classification Search
CPC ......... H04N 5/232933; H04N 5/23209; H04N 5/23219; H04N 5/232939; G06F 3/0482; G06F 3/04883; G06F 3/013; G06F 3/04842; G06F 3/04847; G03B 2213/025; G03B 13/02
See application file for complete search history.

(56) References Cited

U.S. PATENT DOCUMENTS

| 8,024,669 | B2 | 9/2011 | Hitosuga | |
| 10,540,009 | B2* | 1/2020 | Sudou | H04M 19/04 |
| 2017/0147859 | A1* | 5/2017 | Zhang | G02B 27/149 |
| 2018/0227481 | A1* | 8/2018 | Kimura | H04N 5/23219 |

FOREIGN PATENT DOCUMENTS

JP 2009177365 A 8/2009

* cited by examiner

*Primary Examiner* — Padma Haliyur
(74) *Attorney, Agent, or Firm* — Rossi, Kimms & McDowell LLP

(57) ABSTRACT

An electronic device comprising a display control unit configured to perform control to display a plurality of display items on a display, each display item corresponding to one of a plurality of setting items including a specified setting item; and a control unit configured to perform control to in case where the predetermined operation for the specified setting item is received and a line-of-sight input to a corresponding region for a display item corresponding to the specified setting item is received, display the display item corresponding to the specified setting item in a first display appearance, and in case where the predetermined operation for the specified setting item is received and a line-of-sight input to the corresponding region is not received, display the display item corresponding to the specified setting item in a second display appearance different from the first display appearance.

14 Claims, 6 Drawing Sheets

410

411 411a

412

413

ELECTRONIC DEVICE THAT DISPLAYS A PLURALITY OF DISPLAY ITEMS ON A DISPLAY AND METHOD FOR CONTROLLING ELECTRONIC DEVICE

BACKGROUND OF THE INVENTION

Field of the Invention

The present invention relates to an electronic device and a method for controlling the electronic device.

Description of the Related Art

Electronic devices are conventionally known that display the current status of a plurality of parameters whose settings are changeable, and various other pieces of information.

However, when a large amount of information is displayed, the user may not easily find the desired information on the display screen, compromising the convenience for the user. To solve this problem, techniques have been devised to prominently display the information that should be noticed by the user in each use state.

Japanese Patent Application Publication No. 2009-177365 describes a technique in which, when a change operation is made for a certain character among a plurality of characters displayed, this character is highlighted for a predetermined time period after the change operation.

However, with the technique disclosed in Japanese Patent Application Publication No. 2009-177365, the highlighting of information may be unnecessary for a user who knows where the required information is displayed, and the highlighting can even be annoying and reduce convenience.

SUMMARY OF THE INVENTION

It is an objective of the present invention to provide an electronic device, a method for controlling the electronic device, and a non-transitory computer-readable storage medium that enable a user to recognize the display position of information that should be recognized, while reducing the possibility that the user is annoyed.

An aspect of the present invention is: an electronic device comprising at least one memory and at least one processor which function as: a display control unit configured to perform control to display a plurality of display items on a display, each display item corresponding to one of a plurality of setting items including a specified setting item; a receiving unit configured to receive a predetermined operation; a line-of-sight input unit configured to receive a line-of-sight input that is an input of a position corresponding to a line-of-sight of a user to the display; and a control unit configured to perform control to 1) in case where the predetermined operation for the specified setting item is received and a line-of-sight input to a corresponding region for a display item corresponding to the specified setting item is received, display the display item corresponding to the specified setting item in a first display appearance, and 2) in case where the predetermined operation for the specified setting item is received and a line-of-sight input to the corresponding region is not received, display the display item corresponding to the specified setting item in a second display appearance different from the first display appearance.

Further features of the present invention will become apparent from the following description of exemplary embodiments with reference to the attached drawings.

DESCRIPTION OF THE EMBODIMENTS

External View of Digital Camera 100

Figure 1A:
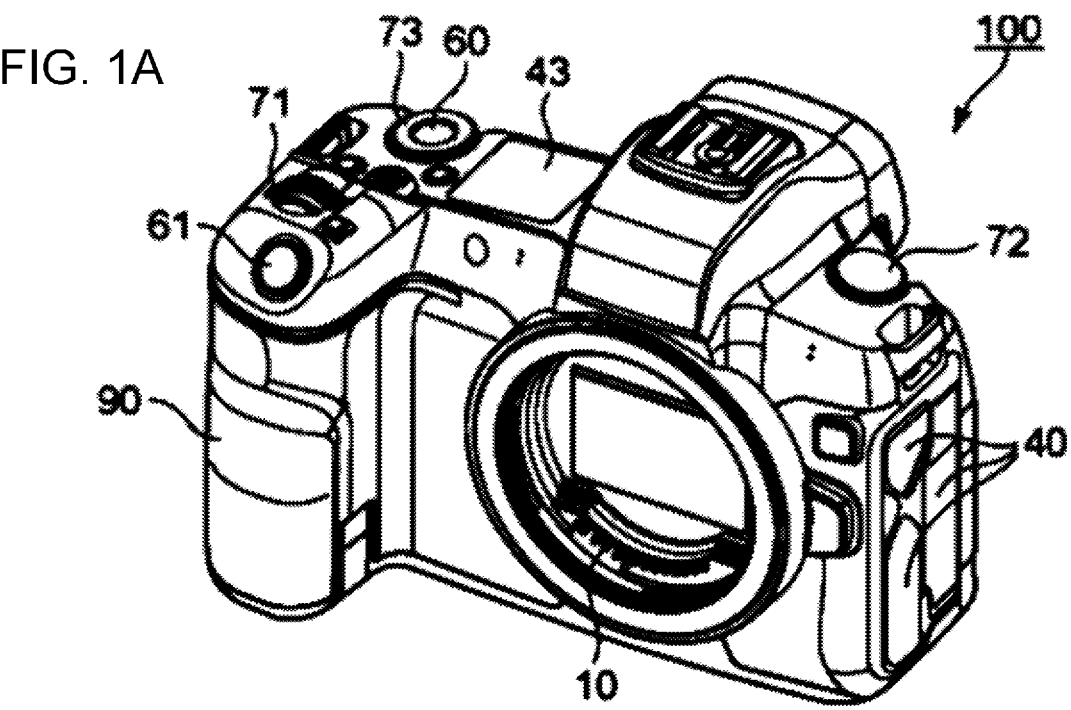
FIGS. 1A and 1B are external views of a digital camera.
Figure 1B:
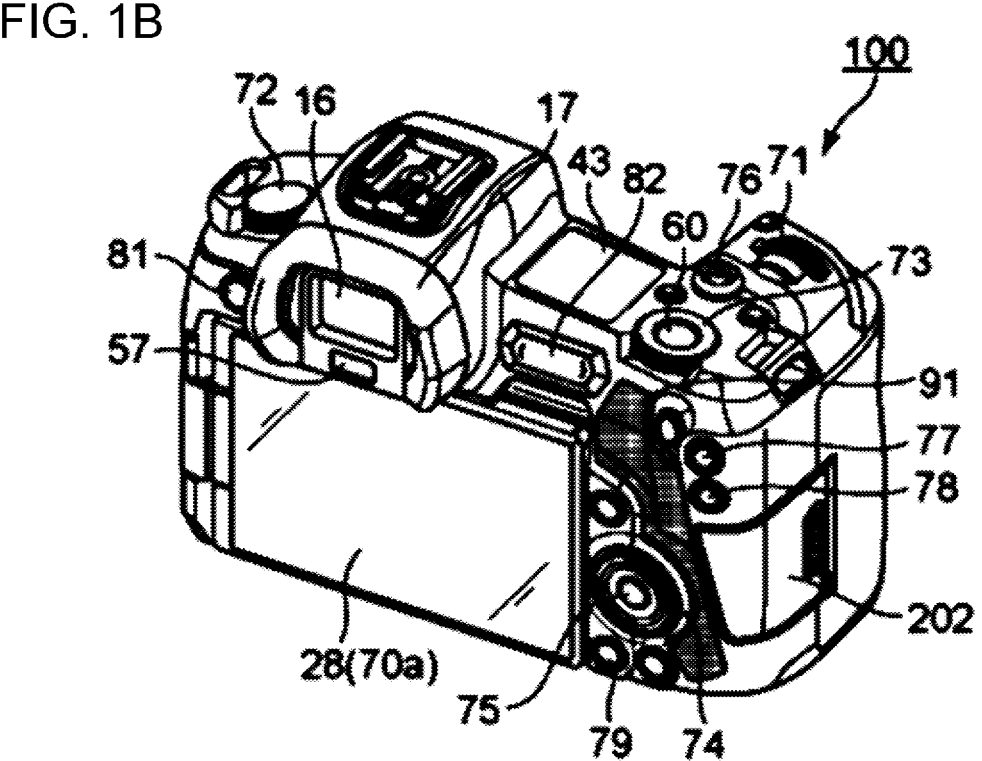

Preferred embodiments according to the present invention are now described with reference to the drawings. FIGS. 1A and 1B are external views of a digital camera 100 (image-capturing device) as an example of a device (electronic device) to which the present invention is applicable. FIG. 1A is a front perspective view of the digital camera 100, and FIG. 1B is a back perspective view of the digital camera 100.

A display unit 28 is provided on the back side of the digital camera 100 and displays images and various types of information. A touch panel 70a can detect a touch operation on the display surface (touch operation surface) of the display unit 28. An out-of-finder display unit 43 is provided on the upper side of the digital camera 100 and displays various setting values of the digital camera 100, such as a shutter speed and a diaphragm aperture. A shutter button 61 is an operation member for instructing the capturing of images. A mode changeover switch 60 is an operation member for switching between various modes. Terminal covers 40 protect connectors (not shown) to connection cables or the like that connect the digital camera 100 to external devices.

An electronic main dial 71 is a rotational operation member that is rotated to change setting values, such as a shutter speed and a diaphragm aperture. A power switch 72 is an operation member that switches the power of the digital camera 100 on and off. An electronic sub-dial 73 is a rotational operation member that is rotated to perform operations such as moving a selection frame (cursor) and image feeding. A four-way key 74 includes upper, lower, left, and right portions that can be individually pressed to enable a process associated with the pressed portion of the four-way key 74. A SET button 75 is a push-button mainly used to confirm a selected setting item.

A moving-image button 76 is used to instruct to start or stop capturing (recording) of a moving image. An AE lock button 77 is a push button. Pressing the AE lock button 77 in an image-capturing standby state fixes the exposure state. An enlargement button 78 is an operation button for switching an enlargement mode on and off in a live view display (LV display) in an image-capturing mode. By operating the electronic main dial 71 after switching on the enlargement mode, a live view image (LV image) can be enlarged or reduced. In a playback mode, the enlargement button 78 functions as an operation button for enlarging a playback image or increasing the enlargement ratio of the playback image. A playback button 79 is an operation button for switching between the image-capturing mode and the playback mode. Pressing the playback button 79 in the image-capturing mode changes the mode to the playback mode and displays the latest image among the images stored in a recording medium 200 (described below) on the display unit 28. A menu button 81 is a push-button used for an instruction operation for displaying a menu screen. Pressing the menu button 81 displays on the display unit 28 the menu screen with which various settings can be performed. A user can intuitively perform various settings with the menu screen displayed on the display unit 28, the four-way key 74, and the SET button 75.

A touch bar 82 (multi-function bar or M-Fn bar) is a linear touch operation member (line touch sensor) capable of receiving touch operations. The touch bar 82 is arranged at a position where a touch operation can be performed on the touch bar 82 (where the touch bar 82 is touchable) with the thumb of the right hand while the grip unit 90 is held with the right hand (held with the little finger, ring finger, and middle finger of the right hand) such that the shutter button 61 can be pressed with the index finger of the right hand. That is, the touch bar 82 is arranged at a position where it can be operated by a user who looks into the finder with an eye positioned at the eyepiece 16 and is in a position ready to press the shutter button 61 at any time (image-capturing position). The touch bar 82 is a receiving unit that can receive operations on the touch bar 82 such as a tap operation (an operation involving touching and then releasing the touch without movement within a predetermined time period) and leftward and rightward slide operations (operations involving touching and then moving the touch position while maintaining the touch). The touch bar 82 is an operation member that differs from the touch panel 70a and does not have a display function.

A communication terminal 10 is used by the digital camera 100 to communicate with a lens unit 150, which is attachable and detachable and described below. An eyepiece 16 is an eyepiece of an eyepiece finder 17 (a look-in finder), and the user can visually check, via the eyepiece 16, an image displayed on an internal electronic viewfinder (EVF) 29. An eye-proximity detecting unit 57 is an eye-proximity detecting sensor that detects whether an eye of a user (photographer) is positioned at the eyepiece 16. A lid 202 is a lid of a slot in which the recording medium 200 (described below) is stored. The grip unit 90 is a holding portion shaped to be readily gripped by the right hand of the user to hold the digital camera 100. The shutter button 61 and the electronic main dial 71 are arranged at positions that are operable with the index finger of the right hand in a state of holding the digital camera 100 with the little finger, ring finger, and middle finger of the right hand gripping the grip unit 90. Additionally, the electronic sub-dial 73 and the touch bar 82 are arranged at positions that are operable with the thumb of the right hand in the same state. A thumb rest unit 91 (a thumb standby position) is a grip member provided at a position on the back side of the digital camera 100 where the thumb of the right hand gripping the grip unit 90 can be readily placed while the right hand is not operating any operation members. The thumb rest unit 91 may be formed by a rubber member to enhance the holding force (grip feeling).

Configuration Block Diagram of Digital Camera 100

Figure 2:
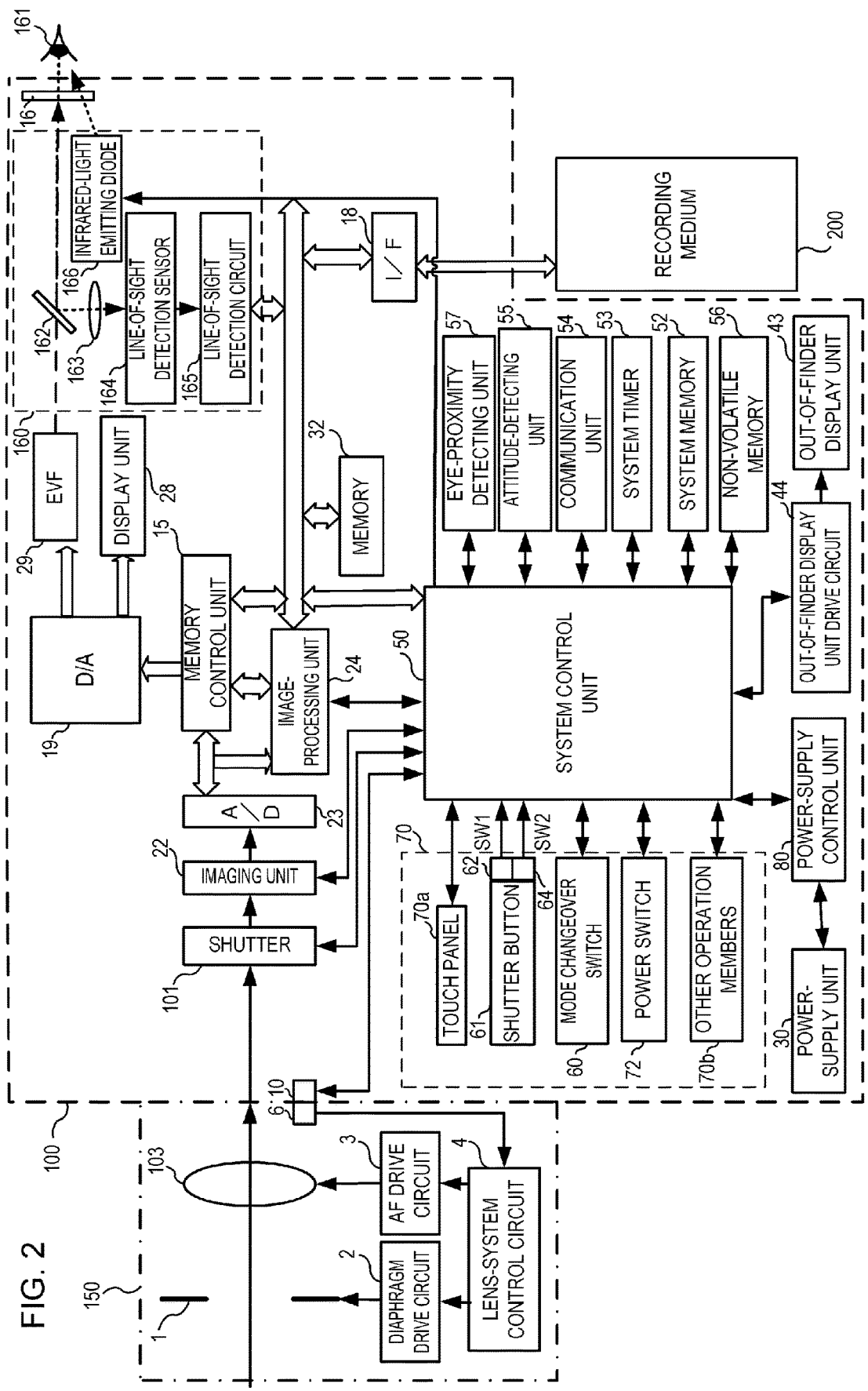
FIG. 2 is a diagram illustrating the configuration of the digital camera.

FIG. 2 is a block diagram showing a configuration example of the digital camera 100. The lens unit 150 includes replaceable photographing lenses. Lenses 103 usually consist of a plurality of lenses, but FIG. 2 simply shows only one lens. A communication terminal 6 is used by the lens unit 150 to communicate with the digital camera 100, and a communication terminal 10 is used by the digital camera 100 to communicate with the lens unit 150. The lens unit 150 communicates with a system control unit 50 via these communication terminals 6 and 10. The lens unit 150 includes a lens-system control circuit 4, which controls a diaphragm 1 via a diaphragm drive circuit 2. The lens-system control circuit 4 of the lens unit 150 also changes the position of the lens 103 via an AF drive circuit 3 for focusing.

A shutter 101 is a focal-plane shutter that can freely control the exposure time of an imaging unit 22 under the control of the system control unit 50.

The imaging unit 22 is an imaging element (image sensor), which may be a CCD or a CMOS, for converting an optical image into an electric signal. The imaging unit 22 may have an imaging-surface phase-difference sensor that outputs information on a defocusing amount to the system control unit 50. An A/D converter 23 converts an analog signal output from the imaging unit 22 into a digital signal.

An image-processing unit 24 performs predetermined processes (e.g., pixel interpolation, resizing such as reduction, and color conversion) on data received from the A/D converter 23 or data received from a memory control unit 15. The image-processing unit 24 also performs a predetermined calculation process using the captured image data, and the system control unit 50 performs exposure control and distance measurement control based on the calculation result obtained by the image-processing unit 24. This allows for processing such as through-the-lens (TTL) autofocus (AF) processing, autoexposure (AE) processing, and pre-flashing (EF) processing. The image-processing unit 24 further performs a predetermined calculation process using the captured image data, and performs TTL auto white balance (AWB) processing based on the obtained calculation result.

The output data from the A/D converter 23 is written into a memory 32 via the image-processing unit 24 and the memory control unit 15. Alternatively, the output data from the A/D converter 23 is written into the memory 32 via the memory control unit 15 without going through the image-processing unit 24. The memory 32 stores the image data that is obtained by the imaging unit 22 and converted into digital data by the A/D converter 23, and the image data to be displayed on the display unit 28 and the EVF 29. The memory 32 has a storage capacity sufficient to store a predetermined number of still images, and moving images and audio of predetermined durations.

The memory 32 also serves as a memory for displaying images (video memory). A D/A converter 19 converts image display data stored in the memory 32 into analog signals and feeds the signals to the display unit 28 and the EVF 29. The image data for display written in the memory 32 is thus displayed on the display unit 28 and the EVF 29 via the D/A converter 19. Each of the display unit 28 and the EVF 29 is a display, such as an LCD or an organic EL, and displays images according to the analog signal received from the D/A converter 19. Digital signals that have been subjected to A/D conversion by the A/D converter 23 and accumulated in the memory 32 are converted into analog signals by the D/A converter 19 and sequentially transferred to the display unit 28 or the EVF 29 to be displayed, thereby achieving live view (LV) display. Hereinafter, an image displayed in the live view display is referred to as a live view image (LV image).

The system control unit 50 is a control unit including at least one processor and/or at least one circuit and controls the entire digital camera 100. The system control unit 50 is both a processor and a circuit. The system control unit 50 performs various processes of the present embodiment, which will be described below, by executing a program recorded in a non-volatile memory 56. The system control unit 50 also performs display control by controlling the memory 32, the D/A converter 19, the display unit 28, and the EVF 29, for example.

A system memory 52 may be a RAM, and the system control unit 50 loads data such as the constants and variables for the operation of the system control unit 50 and a program read from the non-volatile memory 56 in the system memory 52.

The non-volatile memory 56 is a memory that is electrically erasable and recordable, such as an EEPROM. The non-volatile memory 56 records constants, a program, and other data for the operation of the system control unit 50. The program is used to perform the process of a flowchart of the present embodiment, which will be described below.

A system timer 53 is a time-measuring unit that measures time used for various controls and the time of the built-in clock.

A communication unit 54 transmits and receives video signals and audio signals to and from an external device connected wirelessly or by cable. The communication unit 54 can also be connected to a wireless local area network (LAN) and the Internet. Additionally, the communication unit 54 can also communicate with an external device via Bluetooth (registered trademark) or Bluetooth Low Energy. The communication unit 54 can transmit images (including LV images) captured by the imaging unit 22 and images recorded on the recording medium 200, and can receive image data and various other types of information from external devices.

An attitude-detecting unit 55 detects the attitude of the digital camera 100 relative to the direction of gravitational force. Based on the attitude detected by the attitude-detecting unit 55, a determination can be made as to whether an image captured by the imaging unit 22 is an image captured while holding the digital camera 100 horizontally or an image captured while holding the digital camera 100 vertically. The system control unit 50 can add information on the direction corresponding to the attitude detected by the attitude-detecting unit 55 to the image file of the image captured by the imaging unit 22 and record a rotated version of the image. The attitude-detecting unit 55 may be an acceleration sensor or a gyro sensor, for example. A motion of the digital camera 100 (such as pan, tilt, lift, or whether it is stationary) can be detected with the acceleration sensor or the gyro sensor serving as the attitude-detecting unit 55.

An eye-proximity detecting unit 57 is an eye-proximity detecting sensor that detects (approach detection) an approach (eye approach) and a separation (eye separation) of an eye (object) with respect to the eyepiece 16 of the eyepiece finder 17 (hereinafter, simply referred to as a "finder"). The system control unit 50 switches between display (displayed state) and hide (hidden state) of the display unit 28 and the EVF 29 in accordance with the state detected by the eye-proximity detecting unit 57. Specifically, when a current state is at least the image-capturing standby state and the display destination is to be automatically switched, while an eye approach is not detected, the display unit 28 is set as the display destination and its display is turned on, and the EVF 29 is hidden. While an eye approach is detected, the EVF 29 is set as the display destination and its display is turned on, and the display unit 28 is hidden.

The eye-proximity detecting unit 57 may be an infrared proximity sensor that is capable of detecting an approach of any object toward the eyepiece 16 of the finder 17 incorporating the EVF 29. When an object approaches, infrared light projected from a light-projecting unit (not shown) of the eye-proximity detecting unit 57 are reflected on the object and received by a light-receiving unit (not shown) of the infrared proximity sensor. It is also possible to determine how close the object is to the eyepiece 16 (eye-proximity distance) based on the amount of infrared light received. In this manner, the eye-proximity detecting unit 57 performs eye-approach detection that detects a distance of approach of an object with respect to the eyepiece 16. In a state in which an eye approach is not detected (non-approach state), an eye approach is detected when an approaching object is detected within a predetermined distance to the eyepiece 16. In a state in which an eye approach is detected (approach state), an eye separation is detected when the object that has been detected in proximity is moved away beyond the predetermined distance.

A threshold for detecting an eye approach and a threshold for detecting an eye separation may differ from each other by, for example, setting a hysteresis. After an eye approach is detected, it is assumed that a state in which an eye approach is detected is maintained until an eye separation is detected. After an eye separation is detected, it is assumed that a state in which an eye separation is detected is maintained until an eye approach is detected. An infrared proximity sensor is merely an example, and the eye-proximity detecting unit 57 may be other sensors capable of detecting a situation that can be considered as an eye approach.

Various setting values of the camera including a shutter speed and a diaphragm aperture are displayed on the out-of-finder display unit 43 via an out-of-finder display unit drive circuit 44.

A power-supply control unit 80 includes components such as a battery-detecting circuit, a DC-DC converter, and a switching circuit for switching between blocks to be energized, and detects whether a battery is mounted, a type of the battery, a remaining battery level, and the like. Additionally, the power-supply control unit 80 controls the DC-DC converter based on detection results thereof and an instruction from the system control unit 50 and supplies respective units, including the recording medium 200, with necessary voltage for a necessary period of time. A power-supply unit 30 may include a primary battery, such as an alkaline battery or a lithium battery, a secondary battery, such as a NiCd battery, a NiMH battery, or a Li battery, or an AC adapter.

A recording medium I/F 18 is an interface with the recording medium 200, which may be a memory card or a hard disk. The recording medium 200 may be a memory card for recording captured images and include a semiconductor memory or a magnetic disk, for example.

An operation unit 70 is an input unit for receiving an operation by a user (user operation) and is used to input various operation instructions to the system control unit 50. As shown in FIG. 2, the operation unit 70 may include the shutter button 61, the mode changeover switch 60, the power switch 72, the touch panel 70a, and other operation members 70b. The other operation members 70b may include the electronic main dial 71, the electronic sub-dial 73, the four-way key 74, the SET button 75, the moving-image button 76, the AE lock button 77, the enlargement button 78, the playback button 79, the menu button 81, and the touch bar 82.

The shutter button 61 includes a first shutter switch 62 and a second shutter switch 64. The first shutter switch 62 is turned on during an operation of the shutter button 61 by a half-press (image-capturing preparation instruction) and generates a first shutter switch signal SW1. In response to the first shutter switch signal SW1, the system control unit 50 starts image-capturing preparation operations of autofocus (AF) processing, autoexposure (AE) processing, auto white balance (AWB) processing, pre-flashing (EF) processing, and the like.

The second shutter switch 64 is turned on upon completion of an operation of the shutter button 61 by a full-press (image-capturing instruction) and generates a second shutter switch signal SW2. In response to the second shutter switch signal SW2, the system control unit 50 starts a series of operations of an image-capturing process from reading the signal from the imaging unit 22 to writing the captured image into the recording medium 200 as an image file.

The mode changeover switch 60 may switch the operation mode of the system control unit 50 to any of a still-image capturing mode, a moving-image capturing mode, and a playback mode. Modes included in the still-image capturing mode are an automatic capturing mode, an automatic scene determination mode, a manual mode, an aperture priority mode (Av mode), a shutter speed priority mode (Tv mode), and a program AE mode (P mode). Other available modes include various scene modes that constitute image-capturing settings for different image-capturing scenes, and a custom mode. The mode changeover switch 60 allows the user to directly switch to any of these modes. Alternatively, after temporarily switching to a list screen of the image-capturing modes using the mode changeover switch 60, another operation member may be used to selectively switch to any of a plurality of displayed modes. In a similar manner, the moving-image capturing mode may also include a plurality of modes.

The touch panel 70a is a touch sensor that can detect various touch operations on the display surface of the display unit 28 (the operation surface of the touch panel 70a). The touch panel 70a and the display unit 28 can be integrally configured. For example, the touch panel 70a is configured such that the transmittance of light does not obstruct the display by the display unit 28, and is mounted to the upper layer of the display surface of the display unit 28. Then, input coordinates on the touch panel 70a and display coordinates on the display surface of the display unit 28 are associated with each other. This provides a graphical user interface (GUI) that allows the user to feel as if a screen displayed on the display unit 28 can be directly manipulated.

The system control unit 50 is capable of detecting the following operations to the touch panel 70a and the following states of the touch panel 70a.

A new touch on the touch panel 70a by a finger or a stylus previously not in touch with the touch panel 70a or, in other words, a start of a touch (hereinafter referred to as a touch-down)

A state where the touch panel 70a is being touched by a finger or a stylus (hereinafter referred to as a touch-on)

A finger or a stylus moving while in touch with the touch panel 70a (hereinafter referred to as a touch-move)

A separation (release) from the touch panel 70a by a finger or a stylus previously in touch with the touch panel 70a or, in other words, an end of a touch (hereinafter referred to as a touch-up)

A state where nothing is touching the touch panel 70a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as the position coordinates where a finger or a stylus touches the touch panel 70a through an internal bus. Based on the notified information, the system control unit 50 determines what type of operation (touch operation) has been performed on the touch panel 70a. For a touch-move, a movement direction of a finger or a stylus moving on the touch panel 70a can also be determined for each of a vertical component and a horizontal component on the touch panel 70a based on the change in the position coordinates. When a touch-move of a predetermined distance or more is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the surface of the touch panel 70a as though flicking at the touch panel 70a. A determination that a flick has been performed can be made (a determination that a flick has occurred following a slide operation can be made) when a detection of a touch-move of a predetermined distance or more at a predetermined speed or more is followed by a detection of a touch-up. Furthermore, a touch operation involving touching (multi-touching) a plurality of locations (for example, two points) at the same time and bringing the touch positions close to each other is referred to as a pinch-in, while a touch operation in which the touch positions are distanced from each other is referred to as a pinch-out. A pinch-out and a pinch-in are collectively referred to as a pinch operation (or, simply, a pinch). The touch panel 70a may adopt any touch panel system among various systems including a resistive film system, a capacitance system, a surface acoustic wave system, an infrared system, an electromagnetic induction system, an image recognition system, and an optical sensor system. The touch panel 70a may use either a system in which a touch is detected when contact is made with the touch panel, or a system in which a touch is detected when a finger or a stylus approaches the touch panel.

A line-of-sight detection block 160 detects a line-of-sight to determine whether the user's eye that is positioned at the eyepiece 16 is looking at the EVF 29, and if so, where the user is looking. The line-of-sight detection block 160 includes a dichroic mirror 162, an image-forming lens 163, a line-of-sight detection sensor 164, an infrared-light emitting diode 166, and a line-of-sight detection circuit 165.

The infrared-light emitting diode 166 is a light-emitting element and irradiates the user's eyeball (eye) 161 positioned at the eyepiece 16 with infrared light. The infrared light emitted from the infrared-light emitting diode 166 is reflected on the eyeball (eye) 161, and the reflected infrared light reaches the dichroic mirror 162. The dichroic mirror 162 reflects only infrared light and transmits visible light. The reflected infrared light whose optical path has been changed is imaged on the imaging surface of the line-of-sight detection sensor 164 via the image-forming lens 163. The image-forming lens 163 is an optical member that constitutes a line-of-sight detection optical system. The line-of-sight detection sensor 164 includes an imaging device such as a CCD image sensor. The line-of-sight detection sensor 164 photoelectrically converts the incident reflected infrared light into an electric signal and outputs it to the line-of-sight detection circuit 165. The line-of-sight detection circuit 165 includes at least one processor, detects the user's viewed point (viewed position) from the image or movement of the user's eyeball (eye) 161 based on the output signal from the line-of-sight detection sensor 164, and outputs the detection information to the system control unit 50.

In the present embodiment, the line-of-sight detection block 160 detects a line-of-sight by a method called pupil center corneal reflection. The pupil center corneal reflection method detects the direction and position of a line-of-sight based on the positional relationship between the pupil of the eyeball (eye) 161 and the reflected infrared light that is emitted from the infrared-light emitting diode 166 and reflected on the eyeball (eye) 161, the cornea in specific. There are various other methods to detect the direction and position of a line-of-sight, including the limbus tracking method that uses the difference in light reflectance between the pupil and the while of the eye. In addition to the methods described above, any line-of-sight detection method may be used that can detect the direction and position of a line-of-sight. In the present embodiment, the light-projecting unit and the light-receiving unit of the eye-proximity detecting unit 57 are provided separately from the infrared-light emitting diode 166 and the line-of-sight detection sensor 164. However, the present invention is not limited to this, and the infrared-light emitting diode 166 may double as the light-projecting unit of the eye-proximity detecting unit 57, and the line-of-sight detection sensor 164 may double as the light-receiving unit.

The system control unit 50 can detect the following operations and states based on the output from the line-of-sight detection block 160.

A line-of-sight of the user whose eye is positioned at the eyepiece 16 is newly input (detected). That is, a line-of-sight input is started.

A line-of-sight input of the user whose eye is positioned at the eyepiece 16 is present.

The user whose eye is positioned at the eyepiece 16 is gazing.

The line-of-sight of the user whose eye is positioned at the eyepiece 16 that has been input is removed. That is, the line-of-sight input is ended.

A state in which the user whose eye is positioned at the eyepiece 16 inputs no line-of-sight.

The "gazing" used herein refers to a situation in which the user keeps looking at substantially the same position for some time. In one example of gaze determination, the user is determined to be gazing when the viewed point of the user moves only within a predetermined movement amount for a predetermined time period (e.g., about 0.5 seconds). The predetermined time period may be set by the user, may be a fixed time period, or may be changed depending on the distance between the most recent viewed point and the current viewed point. For example, based on the detection information received from the line-of-sight detection circuit 165, the system control unit 50 may determine that the user is gazing when a state in which the line-of-sight of the user is detected at substantially the same position (state without line-of-sight movements) has continued longer than a predetermined time period (threshold time period). In another example, the system control unit 50 determines the state without line-of-sight movements when the average position of the positions detected in a short time period is within a predetermined range and also the variation (dispersion) is less than a predetermined value. The short time period used herein is shorter than or equal to the threshold time period described above and includes the latest detection timing.

Control Process of Display Items

Figure 3:
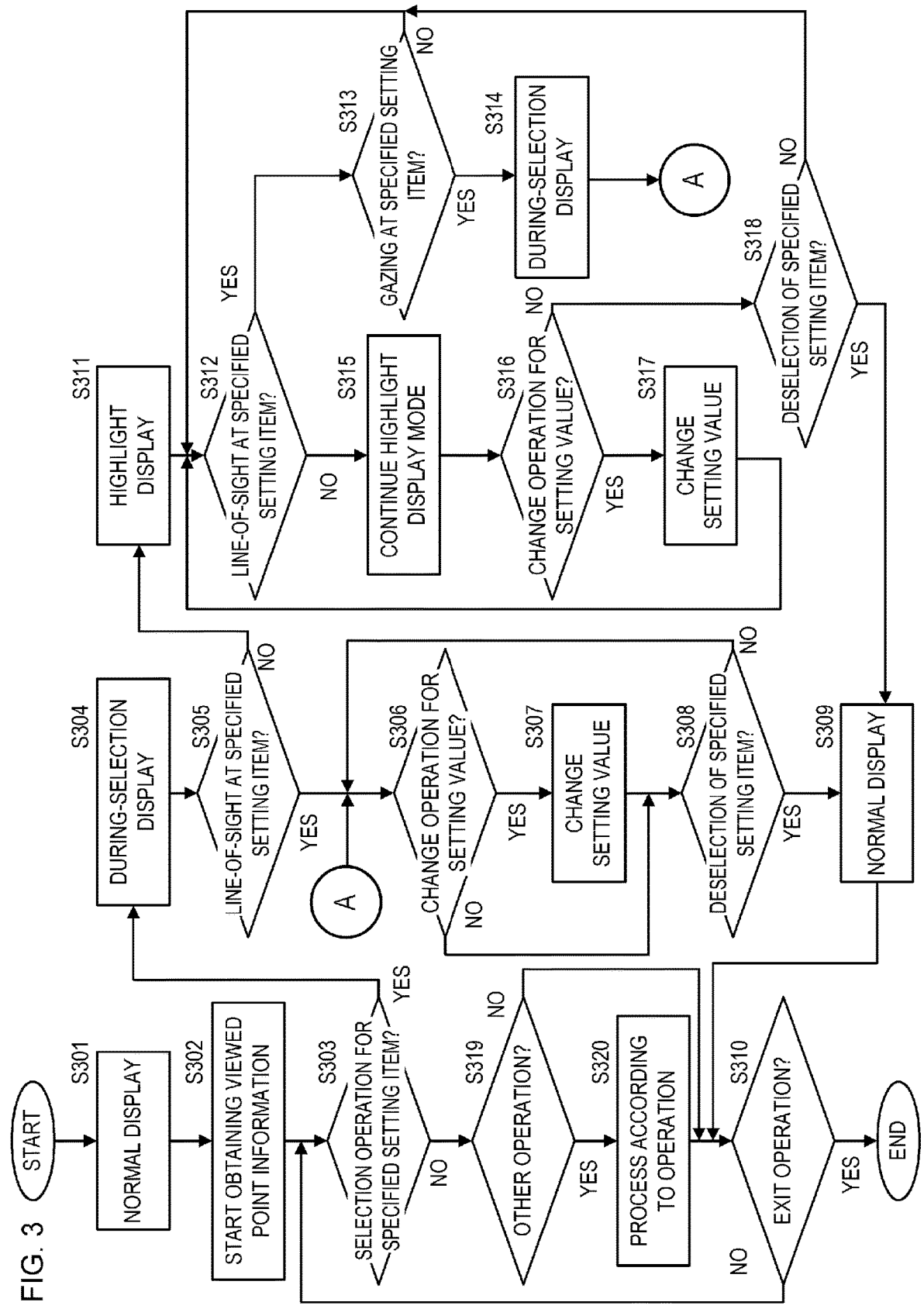
FIG. 3 is a flowchart of a display item control process.

With reference to the flowchart of FIG. 3, the control process (control method) of display items using the line-of-sight information of the user of the present embodiment is now described. The process of the flowchart of FIG. 3 starts in a state in which the power switch 72 is turned on and the user has started to use the digital camera 100. The process of the flowchart of FIG. 3 is performed when a program recorded in the non-volatile memory 56 is loaded into the system memory 52 and executed by the system control unit 50.

Figure 4A:
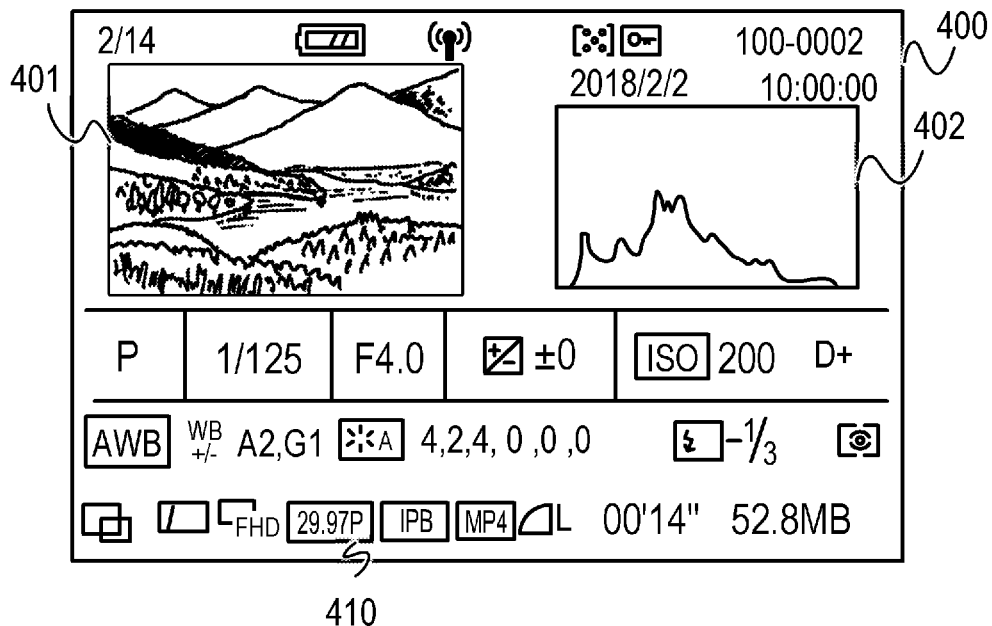
FIGS. 4A to 4D are diagrams illustrating display appearances of display items.

In S301, the system control unit 50 displays a screen regarding the digital camera 100 (setting-list screen 400) on the EVF 29. As shown in FIG. 4A, the setting-list screen 400 displays an arrangement of display items indicating setting values and setting status of various (a plurality of) setting items of the digital camera 100. The setting-list screen 400 also includes an LV image 401, which is captured by the digital camera 100, and a histogram image 402 of the LV image 401. In S301, each display item indicating the setting value and setting status of the corresponding setting item is shown in normal display (normal display state), which indicates that a change operation for changing the setting has not been received.

In S302, the system control unit 50 controls the line-of-sight detection block 160 and starts a process of obtaining information on the user's viewed point (information on the position at which the user is looking). Consequently, in the process after S303, the line-of-sight detection block 160 continuously obtains the viewed point of the user (the position at which the user is looking).

In S303, the system control unit 50 determines whether a selection operation, which is an operation of selecting a specified setting item from a plurality of setting items, has been performed. When a selection operation is performed, the setting value of the selected setting item can be changed or set. If a selection operation for a specified setting item is performed, the process proceeds to S304. If not, the process proceeds to S319. As such, if a selection operation for a setting item that is not included in the specified setting items is performed, the process also proceeds to S319. In the present embodiment, a selection operation is a pressing on the SET button 75, but it may be a pressing on another button, which may a hardware or software button. A selection operation does not have to be a selection operation of selecting a specified setting item, and may be an operation of changing the setting value of a specified setting item.

The specified setting items may be setting items such as frame rate, recording image quality, wireless communication, and metering mode. This is because change operations for these setting items can be performed without looking at the LV image 401, and the highlighting does not obstruct the capturing of images. However, the present invention is not limited to this, and the specified setting items may be any setting items. For example, a setting item that the user tends to forget to check may be registered in advance as a specified setting item by the user.

On the other hand, the setting items that are not included in the specified setting items may be white balance and exposure setting value, for example. This is because their setting status can be easily identified from the LV image 401 without looking at the display items indicating the setting status, so that the necessity for highlighting is low. Additionally, the setting items not included in the specified setting items may be shutter speed and ISO. This is because selection operations for these setting items are likely to be performed while the LV image 401 is viewed, and the highlighting tends to obstruct the capturing of images.

A process of changing the display appearance of a display item is described below using the frame rate of a moving image to be recorded as an example of a specified setting item. As shown in FIG. 4A, a frame rate display item 410 in normal display (normal display state) is displayed in the same size and color as the other setting items.

Figure 4B:
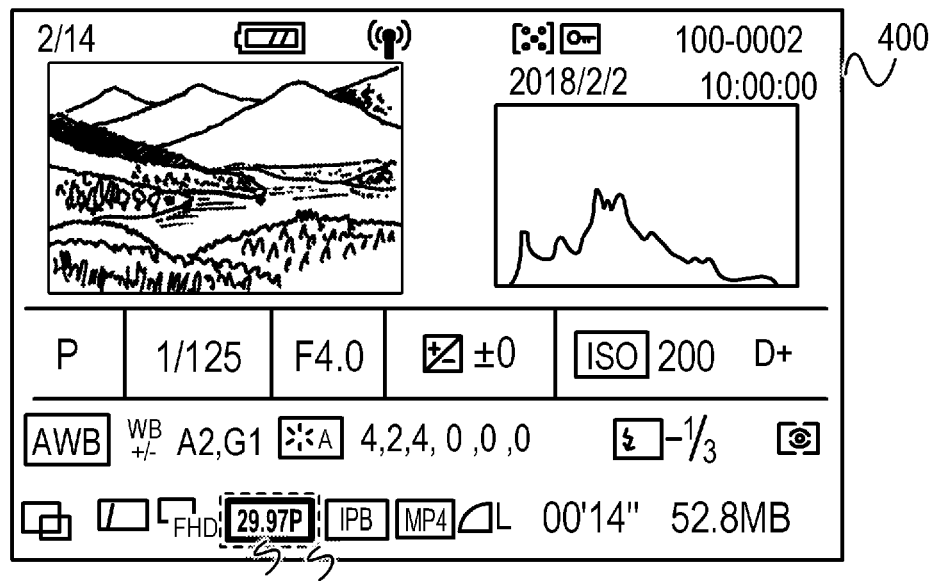

In S304, the system control unit 50 changes the display appearance of the display item of the specified setting item to a during-selection display appearance. The during-selection display appearance is a display appearance indicating that the specified setting item is selected and a change operation for the specified setting item is acceptable. The specified setting item in the during-selection display appearance is displayed more enhanced than in normal display so that it can be easily distinguished from the other setting information. In the present embodiment, as shown in FIG. 4B, the frame rate display item 411 in the during-selection display appearance is highlighted by having a darker character color than the frame rate display item 410 in normal display.

In S305, the system control unit 50 determines whether the viewed point of the user is located in the corresponding region for the specified setting item on the setting-list screen 400. That is, the system control unit 50 determines whether the user is looking at the display icon of the specified setting item immediately (within a predetermined time period) after the selection operation in S303 is performed. If the user's viewed point is in the corresponding region, the process proceeds to S306. If not (when the viewed point is not in the corresponding region), the process proceeds to S311. The process may proceed to S306 when the user's viewed point is in the corresponding region, and proceed to S311 when the viewed point is in a region on the setting-list screen 400 different from the corresponding region. The process of this flowchart may end when the viewed point is not in any of the regions on the setting-list screen 400 or when the viewed point is not detected.

Here, the corresponding region for the specified setting item is the area where the display item of the specified setting item is displayed on the EVF 29 (setting-list screen 400). The corresponding region may be an area that is larger or smaller to some extent than the area where the display item is displayed. For example, the corresponding region in the during-selection display appearance may be a first corresponding region 411a in which the frame rate display item 411 is displayed on the setting-list screen 400 as shown in FIG. 4B. When the user's line-of-sight is in the first corresponding region 411a for frame rate, it can be assumed that the user recognizes (is checking) the frame rate.

In S306, the system control unit 50 determines whether a change operation for the setting value (setting) of the specified setting item is performed. In the present embodiment, a change operation for the setting value of the specified setting item can be performed by pressing a portion of the four-way key 74 in any direction. If a change operation is performed, the process proceeds to S307. If not, the process proceeds to S308.

Figure 4C:
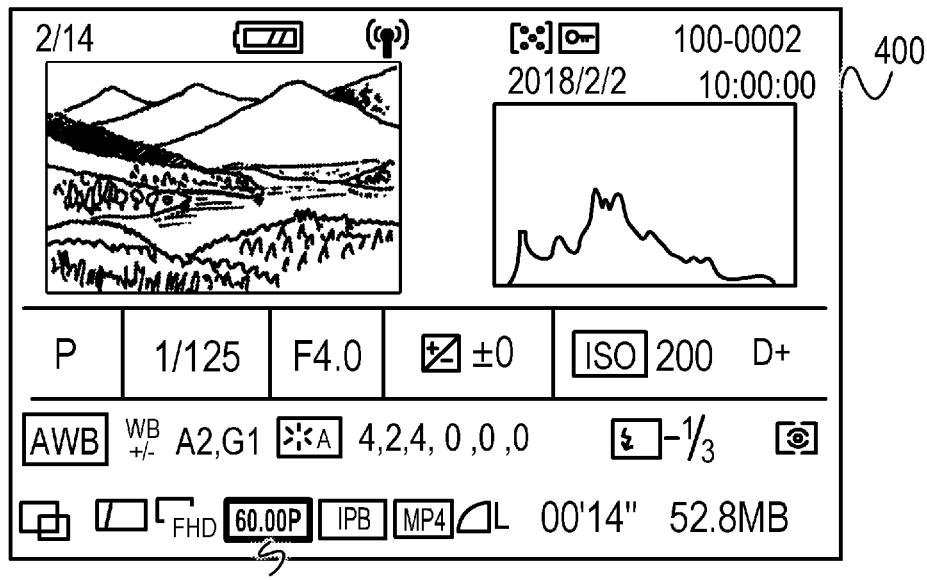

In S307, the system control unit 50 changes the setting value of the specified setting item according to the operation performed in S306. For example, when the frame rate value is changed, the frame rate display item 412 in item-selected-state display, which is similar to the during-selection display appearance, is displayed on the setting-list screen 400 as shown in FIG. 4C.

In S308, the system control unit 50 determines whether a deselection operation of deselecting the specified setting item is performed (or the condition for deselecting the specified setting item is satisfied). If a deselection operation for the specified setting item is performed, the process proceeds to S309. If not, the process proceeds to S306.

A deselection operation can be performed by pressing the SET button 75, and when a deselection operation is performed, the current setting value of the specified setting item is set (confirmed, registered). The system control unit 50 may also determine that a deselection operation is performed (a certain condition for deselection is satisfied) when a non-operation state, in which no user operation is performed, has continued for a predetermined time period after proceeding to S308. When a deselection operation is performed, the state transitions to a state in which a change operation for the specified setting item is not received.

Figure 4D:
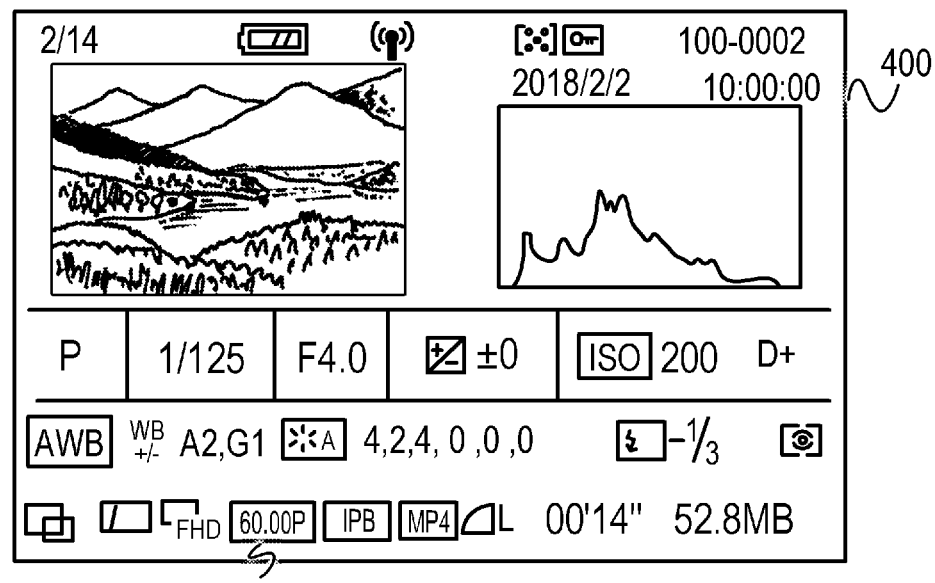

In S309, the system control unit 50 returns the display appearance of the display item of the specified setting item to the normal display appearance. For example, as shown in FIG. 4D, a frame rate display item 413 is displayed with the same character darkness as in FIG. 4A.

In S310, the system control unit 50 determines whether an exit operation such as turning off the power switch 72 has been performed. If an exit operation has been performed, the process of this flowchart ends. If not, the process proceeds to S303. The system control unit 50 may also determine that an exit operation is performed when a non-operation state has continued for a predetermined time period after proceeding to S310.

Figure 5A:
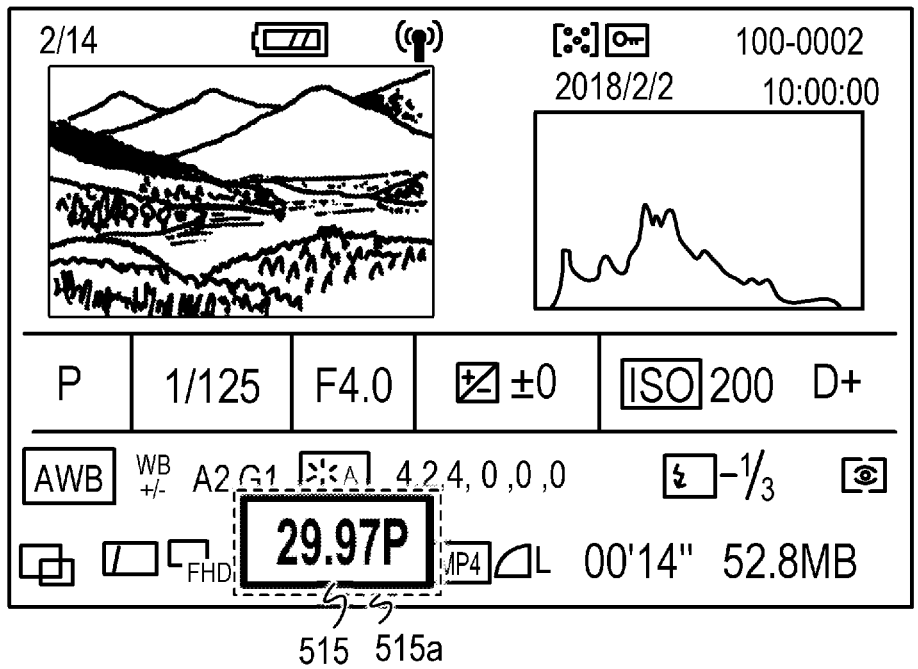
FIGS. 5A and 5B are diagrams illustrating display appearances of display items.

In S311, the system control unit 50 changes the display appearance of the display item of the specified setting item to a highlight display appearance, which displays the display item more prominently than in the during-selection display appearance. For example, as shown in FIG. 5A, a frame rate display item 515 in the highlight display appearance may be displayed in a larger display size than the frame rate display item 411 in the during-selection display appearance. Other examples of highlight display appearance include a blinking display item, a display item in a display color different from that in the during-selection display appearance, and a display item at a display position that is moved toward the screen center from the display position in the during-selection display appearance. That is, any highlight display appearance may be used that facilitates the user's attention to the display item.

In S312, the system control unit 50 determines whether the user's viewed point is in the corresponding region for the specified setting item. The relationship between the setting item and the corresponding region is the same as the relationship described in S305, and the corresponding region for the frame rate display item 515 in the highlight display appearance may be a second corresponding region 515a shown in FIG. 5A. If the user's viewed point is in this corresponding region, the process proceeds to S313. If not, the process proceeds to S315.

In S313, the system control unit 50 determines whether the user's viewed point has stayed in the corresponding region for the specified setting item for a predetermined time period or longer (whether the user is gazing at the specified setting item). If the viewed point has stayed in the corresponding region for the predetermined time period or longer, the process proceeds to S314. If not, the process proceeds to S312. The process proceeds to S312 if the viewed point has stayed in the corresponding region for the specified setting item only for less than the predetermined time period, because there is a possibility that the user fails to visually recognize (check) the selected setting item. The condition for proceeding to S314 is not limited to that the user's viewed point has stayed in the corresponding region for a predetermined time period or longer. For example, the process may proceed to S314 when the viewed point is in a predetermined icon (not shown) displayed on the EVF 29.

In S314, the system control unit 50 changes the display appearance of the display item of the specified setting item to the during-selection display appearance. Upon completing S314, the process proceeds to S306.

In S315, the system control unit 50 keeps the display item of the specified setting item in the highlight display appearance.

In S316, the system control unit 50 determines whether a change operation for the setting value of the specified setting item has been performed, in the same manner as S306. If a change operation has been performed, the process proceeds to S317. If not, the process proceeds to S318.

Figure 5B:
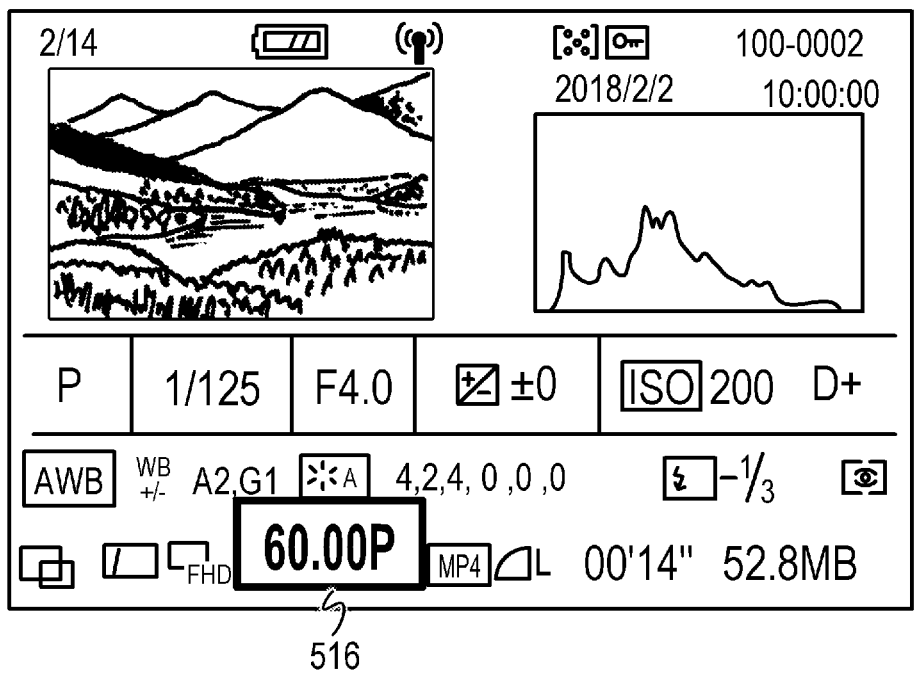

In S317, the system control unit 50 changes the setting value of the specified setting item according to the operation performed in S316. At this time, since the frame rate is displayed in the highlight display state, a frame rate display item 516 is displayed in the same manner as the frame rate display item 515 in the highlight display appearance as shown in FIG. 5B.

In S318, the system control unit 50 determines whether a deselection operation for the specified setting item has been performed, in the same manner as in S308. If a deselection operation has been performed, the process proceeds to S309. If not, the process proceeds to S312.

Although the highlight display appearance reliably captures the attention of the user who can thus check the operation content, other display in the background (such as the setting values of other setting items or the LV image) may be hidden. As such, for the user who already knows and looks at the position where the change of setting is made in response to the operation may find the highlighting of the setting item obstructing and fail to perform an operation such as adjusting the setting value of another setting item while looking at a different position.

However, according to the present embodiment, the digital camera 100 does not use the highlight display appearance when it is assumed that the user has already looked at and knows the position where the setting change is made in response to the operation. This may reduce the possibility that the user is annoyed. The present embodiment assumes that the user recognizes the setting change when the viewed point is in the corresponding region for the setting item immediately after this setting item is changed (YES in S305), and therefore does not use the highlight display appearance so as not to obstruct user's operations.

In contrast, when the user is not looking at the position indicating the setting change of the setting item performed in response to the operation, the user may not recognize the setting change made in response to the operation. For this reason, the digital camera 100 changes the display appearance of the setting item to the highlight display appearance, giving priority to ensuring that the user recognizes the setting change made in response to the operation. In the present embodiment, if the viewed point is not in the corresponding region for the setting item immediately after the setting of the setting item is changed (NO in S305), this setting item is displayed in the highlight display appearance since there is a possibility that the user does not recognize the setting change.

Furthermore, in the present embodiment, if the viewed point is not in the corresponding region for the specified setting item after the specified setting item is selected, the display appearance of the display item of the specified setting item is changed to the highlight display appearance. On the other hand, when another setting item that is not one of the specified setting items is selected, the display appearance of the display item of this another setting item is not changed to the highlight display appearance even if the viewed point is not in the corresponding region for this setting item. The present embodiment is thus configured because the display item of a specified setting item is less likely to disturb the user when highlighted, while the display item of a setting item other than the specified setting items can disturb the user if highlighted, and the necessity for highlighting is low.

As described above, the present embodiment reduces situations in which the user fails to recognize whether a specified setting item is changed.

The digital camera 100 of the present embodiment changes the display appearance of a setting item on the display screen in accordance with the state of the user's line-of-sight, thereby enhancing the convenience for the user.

In the embodiment described above, when a selection operation for a specified setting item is performed in S303 (YES in S303), the display item of the specified setting item is always displayed in the during-selection display appearance in S304, but the present invention is not limited to this. For example, if the answer is YES in S303, the process may proceed to S305. If the user's line-of-sight is in the corresponding region for the specified setting item in S305, the process may proceed to S304. If not, the process may proceed to S311. If the process proceeds to S304, it may proceed to S306 after S304. In this manner, when it is assumed that the user is not looking at the corresponding region for the specified setting item after a selection operation for the specified setting item is performed, the specified setting item is not displayed in the during-selection display appearance. That is, an unnecessary display process is avoided.

The present embodiment is described with respect to the control process of the image display on the EVF 29, but the same control process is also applicable to the image display on the display unit 28. In this case, the functional unit for detecting the line-of-sight may be arranged at a position where eye information can be obtained from the user's face facing the display unit 28, which may be a position near the eye-proximity detecting unit 57 shown in FIGS. 1A and 1B, for example.

According to the present invention, it is possible to enable the user to recognize the display position of the information that should be recognized, while reducing the possibility that the user is annoyed.

The present invention is not limited to the preferred embodiments described above, and various modifications and variations can be made within the scope of the invention.

The various controls that are performed by the system control unit 50 in the foregoing description may be performed by a single piece of hardware. Alternatively, processes may be shared by a plurality of pieces of hardware (e.g., a plurality of processors and circuits) to control the entire device.

Some preferred embodiments of the present invention are described above in detail, but the present invention is not limited to these specific embodiments, and various embodiments within the scope of the present invention are also included in the present invention. The foregoing embodiments are merely illustrative embodiments of the present invention, and the embodiments may be combined as appropriate.

The foregoing embodiments are examples in which the present invention is applied to a digital camera, but the present invention is not limited to these examples and is applicable to any electronic device that can detect the viewed point on the display unit. That is, the present invention is applicable to personal computers, PDAs, mobile phones, portable image viewers, printer devices with displays, digital photo frames, music players, game machines, and electronic book readers.

Additionally, the present invention is applicable not only to the main body of an image-capturing device, but also to a controller that communicates with an image-capturing device (including a network camera) wirelessly or by wire and remotely controls the image-capturing device. Examples of devices for remotely controlling an image-capturing device include smartphones, tablet PCs, and desktop PCs. Such a controller can remotely control an image-capturing device by sending commands for various operations and settings to the image-capturing device based on operations and processes performed in the controller. Furthermore, the controller may be configured to receive the live view image captured by the image-capturing device via wired or wireless communication and display the image on the controller.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-039158, filed on Mar. 6, 2020, which is hereby incorporated by reference herein in its entirety.

What is claimed is:

1. An electronic device comprising
at least one memory and at least one processor which function as:
a display control unit configured to perform control to display a plurality of display items on a display, each display item corresponding to one of a plurality of setting items including a specified setting item;
a receiving unit configured to receive a predetermined operation;
a line-of-sight input unit configured to receive a line-of-sight input that is an input of a position corresponding to a line-of-sight of a user to the display; and
a control unit configured to perform control to
1) in case where the predetermined operation for the specified setting item is received and a line-of-sight input to a corresponding region for a display item corresponding to the specified setting item is received, display the display item corresponding to the specified setting item in a first display appearance, and
2) in case where the predetermined operation for the specified setting item is received and a line-of-sight input to the corresponding region is not received, display the display item corresponding to the specified setting item in a second display appearance different from the first display appearance,
wherein the control unit is further configured to perform control to, in response to a line-of-sight input to the corresponding region for the display item displayed in the second display appearance satisfying a predetermined condition after the display item corresponding to the specified setting item being displayed in the second display appearance, display the display item in the first display appearance.

2. The electronic device according to claim 1, wherein the second display appearance is a display appearance in which a display size of the display item corresponding to the specified setting item is larger than a display size in the first display appearance.

3. The electronic device according to claim 1, wherein the second display appearance is a display appearance in which a display position of the display item corresponding to the specified setting item is closer to a screen center of the display than a display position in the first display appearance.

4. The electronic device according to claim 1, wherein a display color of the display item corresponding to the specified setting item in the second display appearance differs from a display color of the display item in the first display appearance.

5. The electronic device according to claim 1, wherein the predetermined condition is that a viewed point of the user stays for a predetermined time period or longer in the corresponding region for the display item corresponding to the specified setting item.

6. The electronic device according to claim 1, wherein
the control unit is further configured to perform control to
in response to the predetermined operation for the specified setting item being received, display the display item corresponding to the specified setting item in the first display appearance regardless of whether a line-of-sight input to the corresponding region for the display item corresponding to the specified setting item is received or not, and
in case where a line-of-sight input to the corresponding region for the display item displayed in the first display appearance is not received, display the display item by changing from the first display appearance to the second display appearance.

7. The electronic device according to claim 1, wherein the control unit is further configured to perform control to, in case where the predetermined operation for the specified setting item is received and a line-of-sight input to the corresponding region for the display item corresponding to the specified setting item is not received, display the display item in the second display appearance without displaying the display item in the first display appearance.

8. The electronic device according to claim 1, wherein the control unit is further configured to perform control, in case where the predetermined operation for a second setting item of the plurality of setting items that differs from the specified setting item is received, so as not to display the second setting item in the second display appearance regardless of whether a line-of-sight input to a corresponding region for the display item corresponding to the second setting item is received or not.

9. The electronic device according to claim 8, wherein the second setting item is a setting item of any of white balance, exposure setting value, shutter speed, and ISO.

10. The electronic device according to claim 1, wherein the specified setting item is a setting item of any of frame rate, recording image quality, wireless communication, and metering mode.

11. The electronic device according to claim 1, wherein the predetermined operation is an operation of selecting one setting item from the plurality of setting items and enabling a setting value of the selected setting item to be changed or set.

12. The electronic device according to claim 1, wherein the control unit is further configured to perform control to
in case where the predetermined operation for the specified setting item is not received, display the display item corresponding to the specified setting item in a third display appearance, and
in response to a specific condition being satisfied after the display item is displayed in one of the first display appearance and the second display appearance, display the display item in the third display appearance.

13. A method for controlling an electronic device, the method comprising:
a step of performing control to display a plurality of display items on a display, each display item corresponding to one of a plurality of setting items including a specified setting item;
a step of receiving a predetermined operation;
a step of receiving a line-of-sight input that is an input of a position corresponding to a line-of-sight of a user to the display; and
a step of performing control to
1) in case where the predetermined operation for the specified setting item is received and a line-of-sight input to a corresponding region for a display item corresponding to the specified setting item is received, display the display item corresponding to the specified setting item in a first display appearance, and
2) in case where the predetermined operation for the specified setting item is received and a line-of-sight input to the corresponding region is not received, display the display item corresponding to the specified setting item in a second display appearance different from the first display appearance,
wherein the step of performing control, in response to a line-of-sight input to the corresponding region for the display item displayed in the second display appearance satisfying a predetermined condition after the display item corresponding to the specified setting item being displayed in the second display appearance, displays the display item in the first display appearance.

14. A non-transitory computer-readable storage medium storing a program for causing a computer to execute a method for controlling an electronic device, the method comprising:
a step of performing control to display a plurality of display items on a display, each display item corresponding to one of a plurality of setting items including a specified setting item;
a step of receiving a predetermined operation;
a step of receiving a line-of-sight input that is an input of a position corresponding to a line-of-sight of a user to the display; and
a step of performing control to
1) in case where the predetermined operation for the specified setting item is received and a line-of-sight input to a corresponding region for a display item corresponding to the specified setting item is received, display the display item corresponding to the specified setting item in a first display appearance, and
2) in case where the predetermined operation for the specified setting item is received and a line-of-sight input to the corresponding region is not received, display the display item corresponding to the specified setting item in a second display appearance different from the first display appearance,
wherein the step of performing control, in response to a line-of-sight input to the corresponding region for the display item displayed in the second display appearance satisfying a predetermined condition after the display item corresponding to the specified setting item being displayed in the second display appearance, displays the display item in the first display appearance.

* * * * *